United States Patent [19]
Schlachter

[11] Patent Number: 5,957,521
[45] Date of Patent: Sep. 28, 1999

[54] UNDERSEAT STORAGE ENCLOSURE

[76] Inventor: Bradley S. Schlachter, 6211 W. Northwest Hwy., Suite 2306, Dallas, Tex. 75225

[21] Appl. No.: 08/662,113

[22] Filed: Jun. 12, 1996

Related U.S. Application Data

[63] Continuation-in-part of application No. 08/408,216, Mar. 22, 1995.

[51] Int. Cl.$^6$ .................................................. B60N 3/12
[52] U.S. Cl. .............................. 296/37.15; 296/188.08; 296/188.09; 224/275
[58] Field of Search ................................ 296/37.15, 24.1, 296/37.1, 37.6, 37.16; 297/188.08, 188.09, 188.01, 188.13, 188.2; 224/275, 42.34, 42.3; 312/235.5, 235.9, 8.12, 8.15, 108, 195, 235.2, 235.7, 258, 257.1; 105/345; 206/476; 114/363

[56] References Cited

U.S. PATENT DOCUMENTS

| | | | |
|---|---|---|---|
| 1,237,750 | 8/1917 | Chappell | 296/37.15 |
| 1,404,484 | 1/1922 | Schoonmaker . | |
| 1,544,018 | 6/1925 | McDonald | 296/37.15 |
| 2,472,185 | 6/1949 | Apel | 114/363 |
| 3,295,887 | 1/1967 | Bacon | 224/275 |
| 3,730,378 | 5/1973 | Albinson et al. | 312/328 |
| 3,942,691 | 3/1976 | Sisak | 224/275 |
| 4,738,217 | 4/1988 | Smith | 114/363 |
| 4,854,261 | 8/1989 | Goldsmith | 114/363 X |
| 4,926,783 | 5/1990 | Lathers | 114/363 |
| 4,927,200 | 5/1990 | Wilkins | 296/37.8 |
| 5,249,724 | 10/1993 | Green . | |
| 5,716,091 | 2/1998 | Wieczorek | 296/37.16 |

FOREIGN PATENT DOCUMENTS 59-206240  11/1984  Japan .................................. 296/37.15

*Primary Examiner*—D. Glenn Dayoan
*Assistant Examiner*—Jason Morrow
*Attorney, Agent, or Firm*—David H. Judson

[57] ABSTRACT

In a vehicle having a foldable passenger seat, there is a storage area underneath the seat. According to the invention, a lockable plate closes up an opening under the seat to thereby inhibit access to the volume of storage space and form a lockable storage enclosure. The plate cooperates with existing underseat components to form the novel underseat enclosure.

11 Claims, 6 Drawing Sheets

UNDERSEAT STORAGE ENCLOSURE

This application is a continuation-in-part of prior copending application Ser. No. 08/408,216, filed Mar. 22, 1995.

TECHNICAL FIELD

The present invention relates to a storage enclosure for a foldable seat of a motor vehicle.

BACKGROUND OF THE INVENTION

Storage space in a passenger motor vehicles is limited and not always sufficient for the need of the vehicle owner and user. Tools, equipment, athletic gear, children's toys and other items which are needed or are desirable to have in the vehicle at various times should be put away after use and not left on the seats, in the footwells or in open storage areas such as the rear cargo decks of station wagons, vans and sport utility vehicles, for example. However, these items are often desired to be accessible from the passenger cabin for use by the vehicle operator or passenger, at will, without having to stop the vehicle and retrieve them from a rear closure type compartment or trunk.

One under-utilized space within a vehicle, which can be useful for storing the above-mentioned articles or other items of value which require protection and secure placement, is beneath foldable or removable seats. Many vehicles, such as so-called sport utility type vehicles, vans, trucks and extended cab light duty trucks, have one or more seats which have a foldable or removable seat part under which space may be utilized for storage of various personal items and accessories. As vehicles are downsized and become more compact, there is continuing interest in fully utilizing such available space.

It is known in the prior art to provide underseat storage containers for various and sundry articles. One such device is illustrated in U.S. Pat. No. 5,249,724 issued to Green, and comprises a rectangular bottom, four upstanding sidewalls, and an upstanding lip or edge to retain the container underneath a rearmost bench seat of a minivan type vehicle. U.S. Pat. No. 1,404,484 issued to Schoonmaker, describes a container that is designed to be supported within the frame of a vehicle seat structure. This container includes a hinged cover which forms part of the seat itself. While such containers are generally useful for their intended purposes, they are overly complex in design due in part to the fact that they are configured to fit specifically to the particular geometry of the seat. This requirement turns out to be unnecessary, as has now been discovered by the present invention.

BRIEF SUMMARY OF THE INVENTION

It is thus a primary object of the present invention to increase the safe and secure storage of various articles that are desired to be carried within a motor vehicle.

It is another object of the invention to provide underseat storage in a vehicle that easy-to-use, secure, lockable, quiet and that exhibits maximum utilization of available storage space.

It is still a further object of the invention to provide underseat lockable storage in a truck or like vehicle using a plate or barrier that closes up an otherwise open area under the seat.

Thus, a further object of the invention is to provide the advantages of lockable storage for a vehicle using the existing underseat structural components for a major part of the enclosure itself. This significantly reduces the cost and complexity of the storage system, and it allows the inventive enclosure to be added as an aftermarket product if desired.

It is a further important object of the invention to provide a unique underseat storage compartment or enclosure for various types of motor vehicles including, without limitation, trucks, light duty trucks, sport utility type vehicles, vans, minivans, stations wagons or other conventional vehicles.

It is another important object of the invention to increase the article storage capability of a light duty truck vehicle (e.g., a Dodge BR) at very low cost using an original-equipment or aftermarket device to create a unique underseat storage enclosure.

It is still another object of the invention to provide for secure, out-of-view, storage of articles in a light duty truck or other similar vehicle having a foldable seat.

It is a further object of this invention to provide an underseat storage compartment formed in part by a bottom surface of the foldable seat itself.

It is still a further object of the invention to provide such a storage compartment that is secure against wrongful entry.

Still another object of this invention is to increase the storage capability of light duty trucks to thereby enable operators or passengers to store tools, equipment, personal belongings, registered firearms and other articles which are desired to be stored out-of-view and out of the way of passengers entering, occupying and leaving the passenger cabin.

In the preferred embodiment, the above objects of the invention are provided in a motor vehicle having a floor, and a seat including a seat part pivotal between a first lowered position and a second raised position offset from the first lowered position by some angle. When the seat part is located in the first lowered position, a volume of storage space exists between the seat and the floor accessible though an opening extending below and across at least a portion of the seat part. In this preferred embodiment, a lockable plate closes up the opening to thereby inhibit access to the volume of storage space to thereby form a lockable storage enclosure. The plate cooperates with existing underseat components to form the novel underseat enclosure.

Preferably, the plate is hingedly-mounted to the floor and is thus pivotal between a first upstanding position, in which the opening is substantially closed and access to the volume of storage space is inhibited, and a second open position, offset from the first position, and in which access to the volume of storage space is facilitated when the seat part is pivoted towards its second raised position. Alternatively, the plate is hingedly-mounted to the bottom of the seat and locked to the floor to form the enclosure.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should now be made to the following Detailed Description taken in conjunction with the following drawings in which.

DETAILED DESCRIPTION OF THE PREFERRED EMBODIMENT

The present invention is shown for exemplary purposes in the passenger cabin of an extended cab light duty truck (such as a Dodge BR), although it should be appreciated the inventive concepts may be implemented in any vehicle having a foldable seat spaced from a floor of the vehicle. Such vehicles include, without limitation, passenger cars, vans, minivans, stations wagons, pickup trucks, sport utility type vehicles, jeeps, and the like. As is well-known, an extended cab light duty truck has one or more seats which have a foldable or removable seat part under which space may be utilized for storage of various personal items and accessories.

Figure 1:
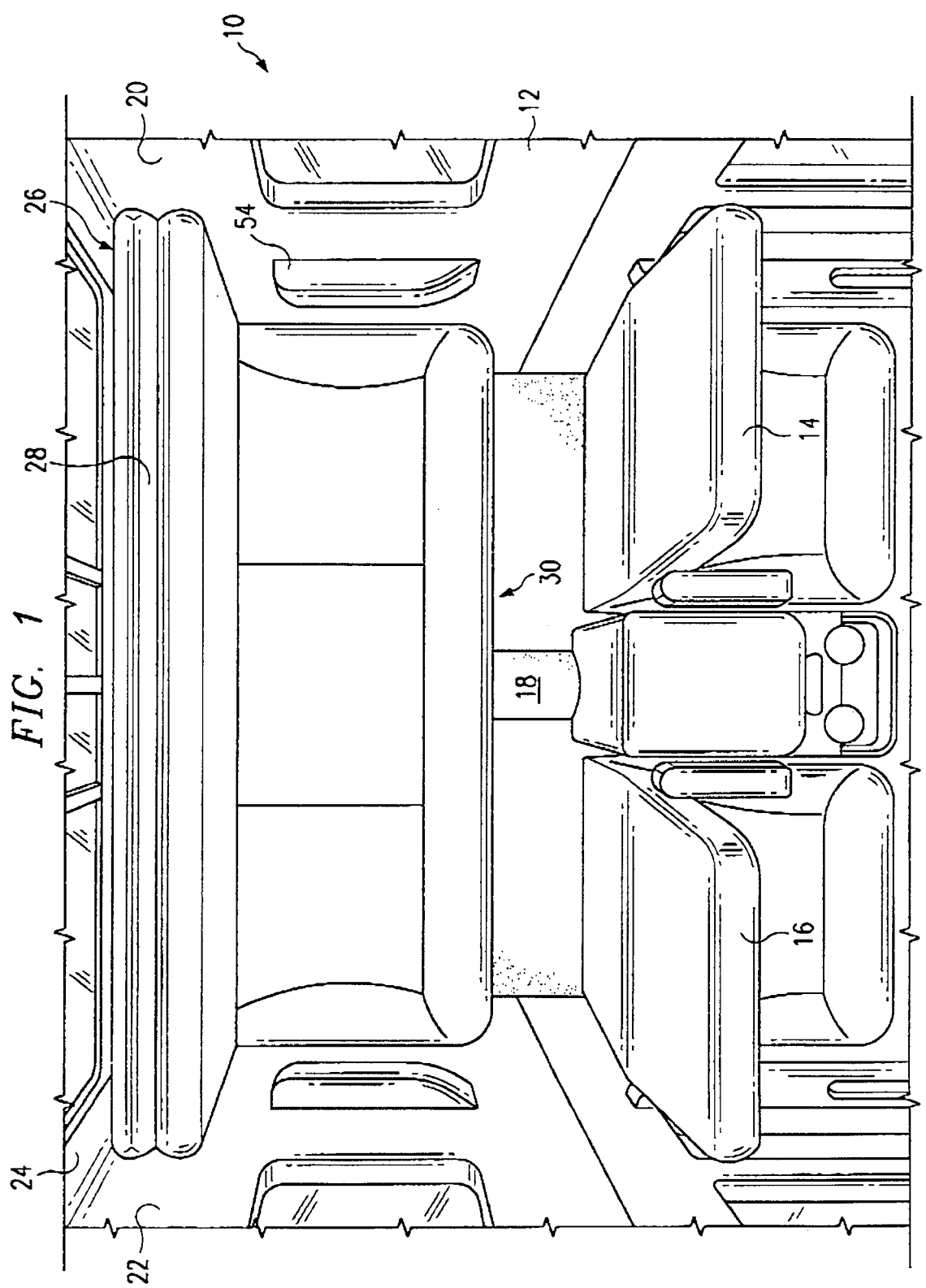
FIG. 1 is a plan perspective view of a portion of a vehicle passenger cabin of a light duty truck with a conventional foldable passenger seat in its lowered or working position.

Referring to FIG. 1, there is shown a portion of a roadable motor vehicle, generally designated by the numeral 10, including a portion of a passenger cabin 11. By way of example only, the vehicle 10 may comprise a light duty or so-called "pickup" truck of a type which has an extended passenger cabin providing a space 18 behind the driver's seat 14 and front passenger seat 16. The space 18 is disposed between opposed cabin sidewalls 20 and 22 and forward of a rear cabin wall 24. The space 18 is adapted to include a passenger seat 26 having a cushioned seatback 28 disposed just forward of the rear wall 24 and a cushioned seat part 30. The passenger cabin 12 includes a generally horizontal cabin floor 40 and a drive shaft clearance tunnel wall 42 projecting upward from the floor 40 in a conventional manner.

The above-described seat arrangement and vehicle are merely exemplary, although they represent one important implementation of the enclosure of the present invention. Light duty trucks have a lack of secure storage space, particularly space which can be subdivided into several storage compartments for containing tools, equipment, personal belongs and other articles which are desired to be stored out of view and out of the way of passengers entering, occupying and leaving the passenger cabin. Those skilled in the art will recognize that the description of the vehicle seat and cabin arrangement heretofore set forth, may also represent roadable motor vehicles including so-called sport utility vehicles, vans, station wagons and other passenger carrying motor vehicles.

Figure 2:
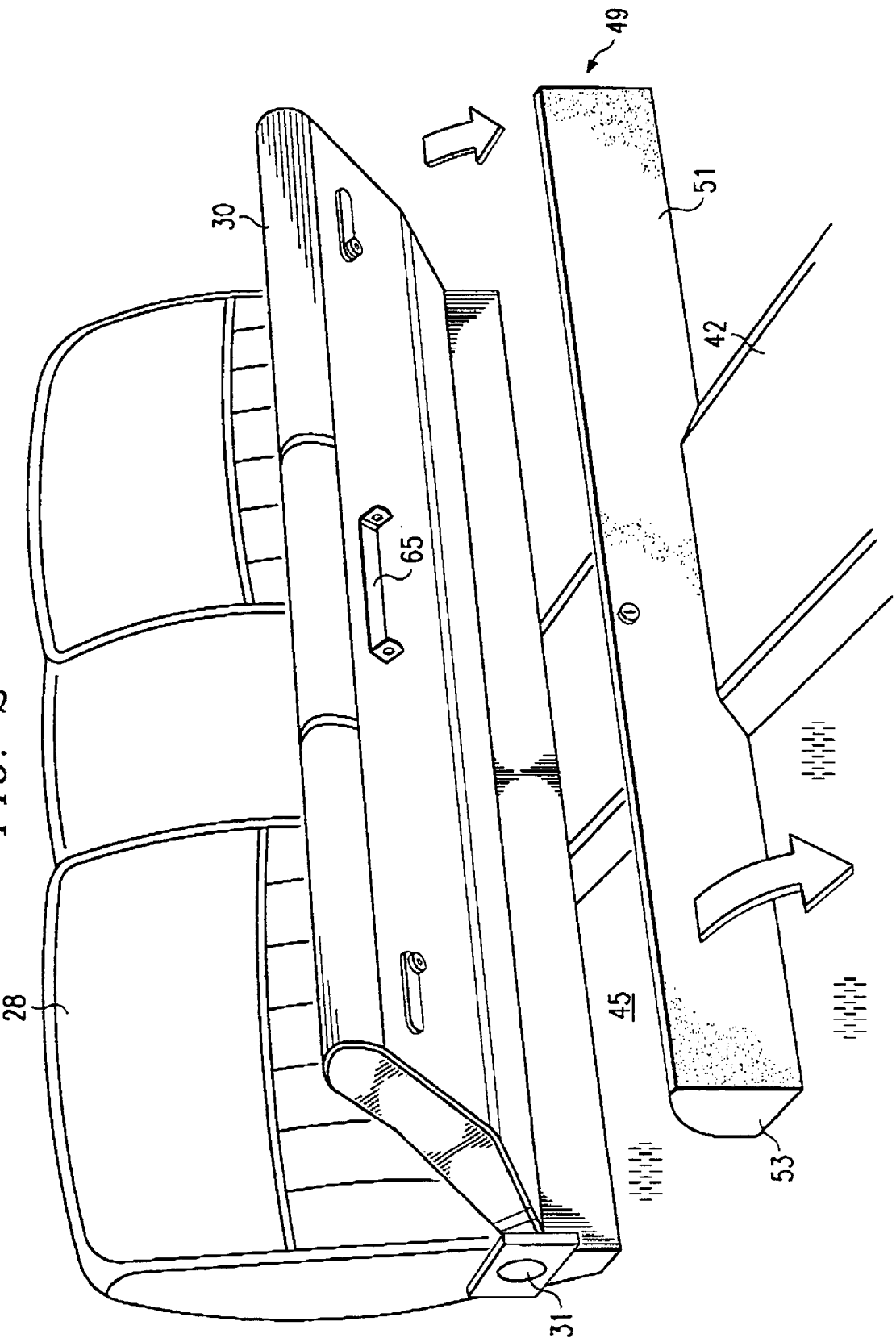
FIG. 2 is a detail perspective view of the passenger seat of FIG. 1 in a partially side elevation of the enclosure showing the seat part or the seat in a partially raised position and the storage space.

Referring now to FIG. 2, a perspective view is shown of the passenger seat under which it is desired to provide a secure, lockable enclosure according to the teachings of the present invention. As shown in FIG. 2, the seat part 30 may be hinged at pivot points 31 (one of which is shown) for movement between a first lowered (i.e., a working) position, shown by the dashed lines, and a second raised or folded position shown in solid lines. Thus, the seat part is pivotable between the first lowered position and the second raised position offset from the first lowered position by some angle, which may extend up to about 90 degrees (but is preferably about 45 degrees).

When the seat part is located in the first lowered position, a volume 45 of storage space exists between the seat and the floor 40 accessible though an opening 47 extending below and across at least a portion of the seat part. In the preferred embodiment of the invention, a plate 49 closes up the opening to thereby inhibit access to the volume 45 of storage space to thereby form a lockable storage enclosure. The plate 49 need not extend across the entire length of the opening under the seat, although it is preferred that it does so extend. A partial plate may be used if it is desired to enclose only part of the underseat area.

Figure 3:
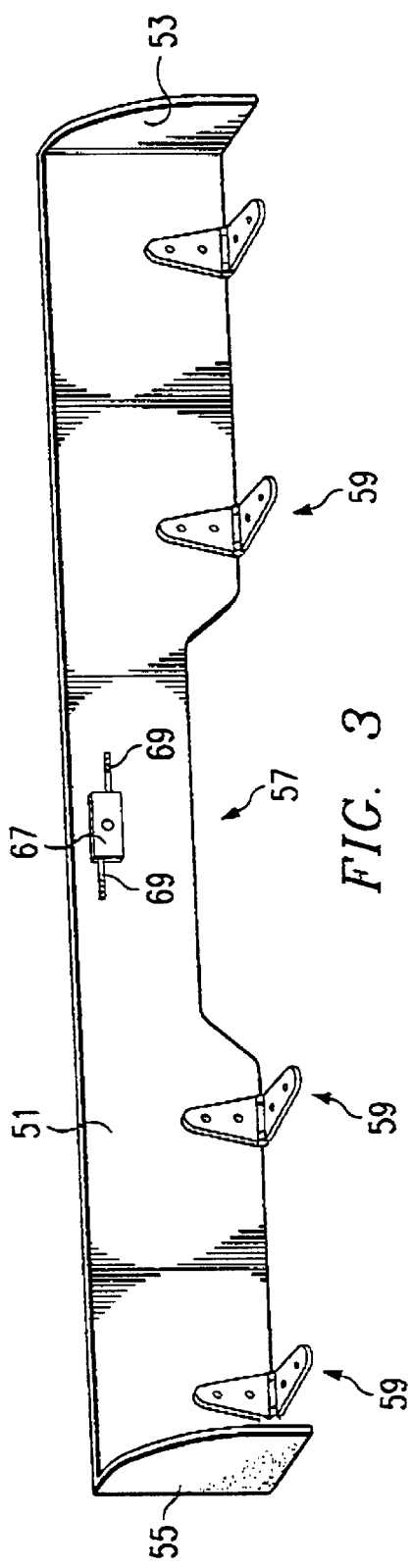
FIG. 3 is a view of the inventive plate of the invention as viewed from the back side.
Figure 4:
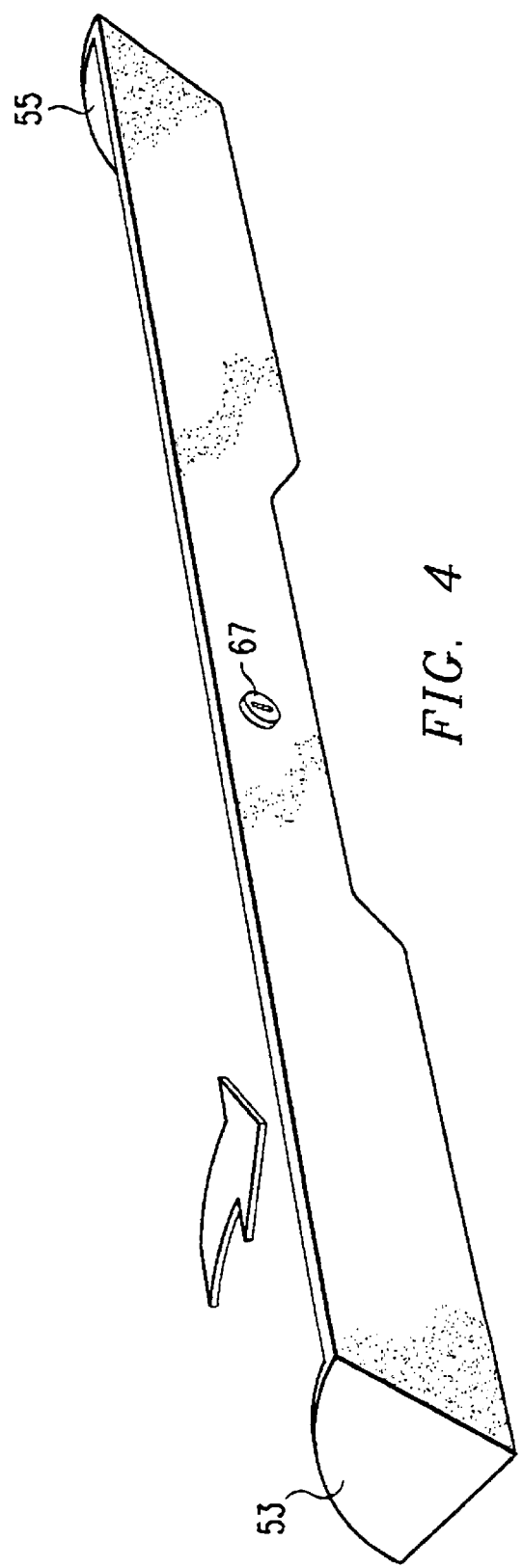
FIG. 4 is a perspective view of the inventive plate in its front tilted position to allow access to the storage space.

Referring now to FIGS. 2–4, the plate preferably comprises a front panel 51, and a pair of shortened side panels 53 and 55. Each of the side panels is preferably integrally formed with the front panel and includes an arcuate configuration. The actual shape of the panel may be altered to "fit" to the particular underseat configuration with which the plate is configured. The front panel 51 has an opening 57 corresponding to the geometry drive shaft clearance tunnel wall 42, however, opening 57 is not required when the plate is used in a vehicle having a level floor. The side panels are preferably "shortened" in the sense that they need only extend a short distance behind the front plate, although the side panels may be extended somewhat further if desired. The basic underseat enclosure, however, is preferably formed by the front panel 51 itself.

In particular, it has been found that the substantial benefits of an underseat enclosure are provided by use of a plate, consisting essentially of the front panel 51, that closes up at least part of the opening under a conventional, foldable passenger seat. These benefits are provided through the use of the single plate, and it should be appreciated that the overall enclosure is formed by the plate in combination with the overall geometry and construction of the existing seat structure. Thus, an underseat enclosure is provided with what amounts to a single plate. This significantly reduces the cost of the device, yet does not sacrifice security, ease-of-use or available storage space.

As seen in FIG. 3, in one embodiment the plate 49 is secured to the floor through one or more hinges 59, which are illustrated as spaced along the length thereof. The hinges enable the plate to pivot between a first upstanding position, in which the opening under the seat is substantially closed and access to the volume of storage space is inhibited, and a second open position, offset from the first position, and in which access to the volume of storage space is facilitated. Depending on the amount of room in front of the rear seat and the presence or absence of the drive shaft tunnel, the second open position may extend up to 90 degrees. Typically, however, the second open position is offset from the first upstanding position by about 45 degrees, which is about the limit of movement of the plate when the drive shaft tunnel is present. This is illustrated in FIG. 4. When the plate is moved towards its open position, access to the volume of storage space is facilitated, especially when the seat back is raised towards its second position.

Other means for supporting the plate include spring or coil like hinges, elongated hinges, brackets, retractable devices and the like.

Referring back to FIG. 2, a locking means is provided to secure the enclosure against wrongful entry when the seat 30 is in the first lowered position and the plate is in its first upstanding position. A preferred locking means includes two parts, a locking bracket 65 secured to the underside of the seat, and a key lock 67 supported in the front panel 51. The key lock 67 is of conventional form and includes a housing 69 (see FIG. 3) in which a locking mechanism is supported. The mechanism controls the retraction of one or more locking arms 69 that cooperate with corresponding openings in the locking bracket 65 in a known manner.

Of course, any conventional locking device may be used, and the locking mechanism may be located alternatively in the seat itself. It is also not required that the locking mechanism be integral to the plate or seat, as a simple latching mechanism may be used in combination with a standalone combination lock.

It should be appreciated that when the plate is in its upright position, it further acts as a barrier to prevent substantial movement of articles located below the seat. This significantly reduces rattle and noise.

It should further be appreciated that the storage area created by the plate may be subdivided into one or more areas for storing objects of different sizes, configurations, and the like. This can be accomplished by using divider or partition walls that have appropriate tabs and/or slots that are interconnected to form storage compartments. One such system is described in copending application Ser. No. 08/408,216, the disclosure of which is hereby incorporated herein by reference in its entirety. As described in that copending application, the storage compartments may be formed with spaced apart fore and aft extending generally vertical sidewalls, and front and rear transverse and vertical end walls forming a generally rectangular box. Compartments may be formed by suitable dividers or intermediate partition walls.

Figure 5:
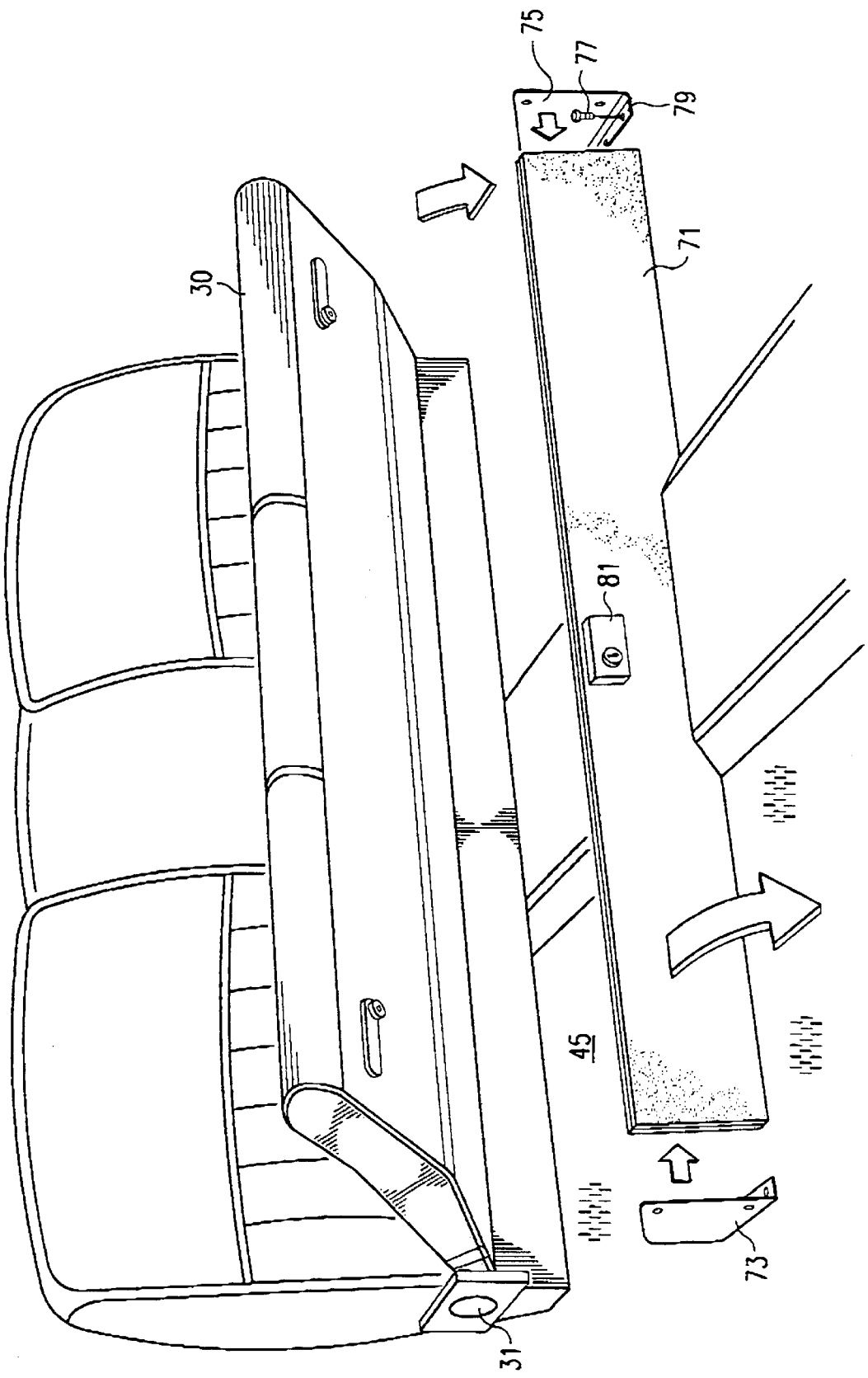
FIG. 5 is a perspective view of a first alternate embodiment of the present invention.
Figure 6:
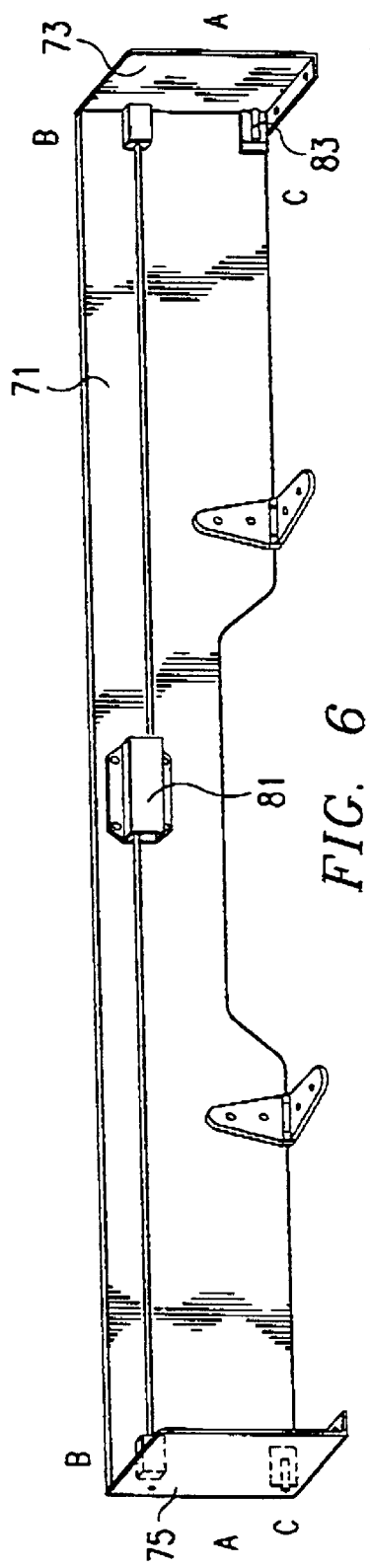
FIG. 6 is a rear view of the plate of FIG. 5 looking forward from the vantage point of the enclosure.
Figure 7:
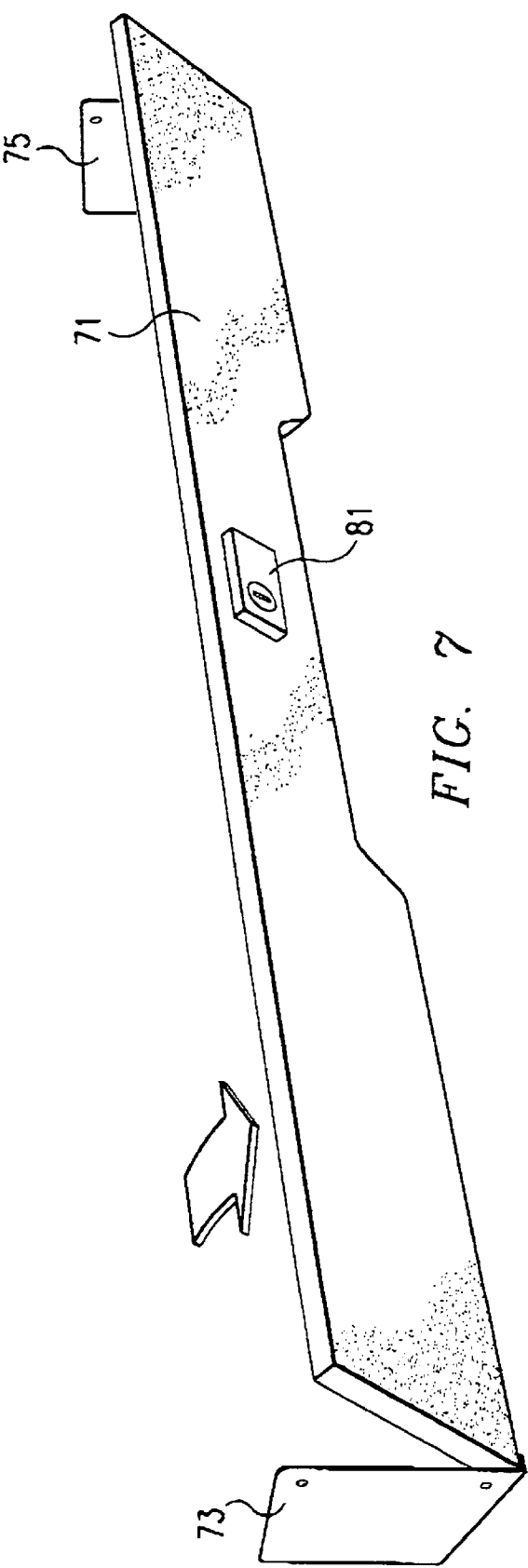
FIG. 7 is a front view of the plate of FIG. 5 is a partially-open or opened position.

FIGS. 5–7 show a first alternative embodiment of the invention wherein a hinged plate 71 cooperates with at least one end panel (two of which are shown by reference numerals 73 and 75) to form the storage enclosure when the seat is in the lowered position. It may be desired to use only a single end panel. Each of the end panels is preferably secured to the vehicle floor (either directly or through a mounting bracket) via fasteners 77, which secure a flanged portion 79. As seen in FIG. 6 (which illustrates the plate in its upstanding or locked position), one or more hinges are used to allow for pivotal movement of the plate relative to the floor (as shown in FIG. 7), and a locking mechanism 81 is provided for securing the enclosure against wrongful entry when the suit bottom is lowered. In this embodiment, the locking mechanism does not include a locking plate on the underside of the seat bottom; rather, the ends of the locking arms are retained in one or both of the end plates as illustrated. The lower portion of the plate at each end may also include an auxiliary latching mechanism 83 to ensure positive contact between the plate and the end plates at all times.

Figure 8:
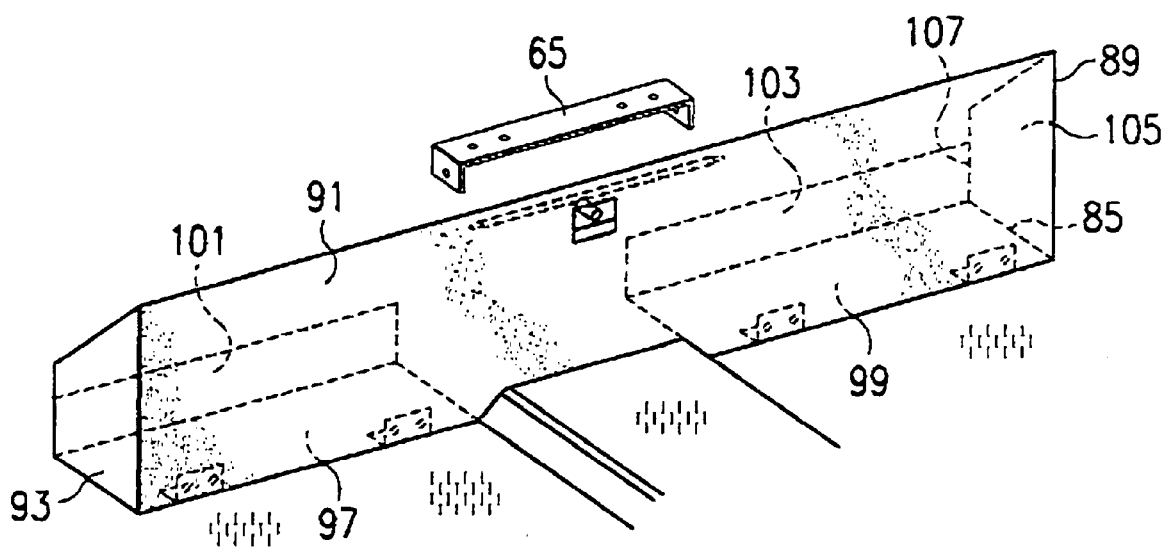
FIG. 8 is a perspective view of a second alternative embodiment of the present invention.

FIG. 8 shows a second alternate embodiment of the invention. In this embodiment, an article comprises the front panel 91, first and second end panels 93 and 95, first and second bottom panels 97 and 99, and first and second back panels 101 and 103. The front panel 91 is hinged for movement in the manner previously described. Thus, in this embodiment the various panels are not joined to each other along at least one or more of the dotted lines 105, 107 and/or 109. In particular, if the front panel is secured to (or integrally formed with) the end panels, then the end panels will not be attached or otherwise joined to the bottom and back panels. Alternatively, the end panels may be attached or otherwise joined with the bottom and back panels and unattached or joined with the front panel to allow the front panel to be pivoted.

Figure 9:
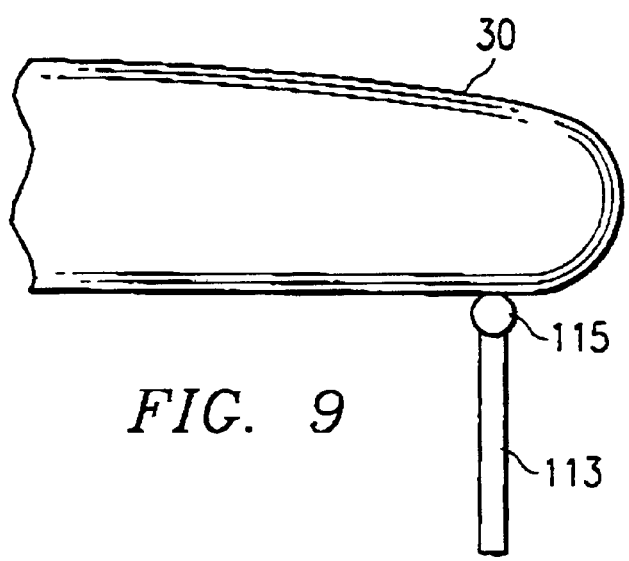
FIG. 9 is a side view of a further embodiment of the invention.

FIG. 9 illustrates a further embodiment in which a plate 113 is supported by hinge means 115 connecting the plate 113 to and underside of the seat part 30.

The plates and articles described above may be fabricated using conventional engineering materials suitable for motor vehicles including fabricated sheet metal, plastics and similar materials used for vehicle interior structural members including trim panels and the like. If desired, the plate may be covered with a decorative material (i.e., "carpeted" or otherwise "cushioned") to provide a pleasing appearance that is otherwise compatible with the vehicle interior.

Although preferred embodiments of the invention have been described in detail herein, those skilled in the art will recognize that various substitutions and modifications may be made without departing from the scope and spirit of the appended claims. As one example, it may be desired to reverse the configuration of the plate attachment so that the plate is hingedly-mounted to the underside of the seat and thus swings out of the way when the seat is lifted upwards. In this embodiment, preferably end panels would be absent or, if present, collapsible) and the locking means might be conveniently located on the floor of the vehicle.

Having thus described my invention, what I claim is:

1. An article for use in a motor vehicle having a floor, and a seat including a seat part pivotable between a first lowered position and a second raised position offset from the first lowered position by some angle, wherein when the seat part is located in the first lowered position a volume of storage space exists between the seat and the floor accessible though an opening extending below and across at least a portion of the seat part, the article comprising:

a plate movable independently of the seat and comprising a front panel; and means for supporting the plate across at least a portion of the opening for inhibiting access to the volume of storage space through the opening when the seat part is located in the first lowered position, wherein the supporting means includes at least one hinge having a first portion attached to the floor and a second portion attached to the plate.

2. The article as described in claim 1 wherein the hinge enables the plate to be moved between a first raised position, in which the opening is substantially closed and access to the volume of storage space is inhibited, and a second open position, offset from the first raised position, in which access to the volume of storage space is facilitated.

3. In a motor vehicle having a floor, and a seat including a seat part pivotable between a first lowered position and a second raised position offset from the first lowered position by some angle, wherein when the seat part is located in the first lowered position a volume of storage space exists between the seat and the floor accessible through an opening extending below and across at least a portion of the seat part, the improvement comprising:

a plate comprising a front panel supported across at least a portion of the opening for inhibiting access to the volume of storage space through the opening when the seat part is located in the first lowered position, said plate being selectively movable relative to said seat part when said seat part is in either said first lowered position or said second raised position to facilitate access to the volume of storage space;

means for pivoting the plate between a first raised position, in which the opening is substantially closed and access to the volume of storage space is inhibited, and a second open position, offset from the first raised position, in which access to the volume of storage space is facilitated when the seat part is pivoted towards the second raised position; and means for locking the plate in the first raised position when the seat part is located in its first lowered position to thereby form a secure enclosure within the volume of space, wherein the means for locking comprises:
a locking mechanism supported in the plate; and
a locking bracket attached to an underside of the seat part.

4. In a motor vehicle having a floor, and a seat including a seat part pivotable between a first lowered position and a second raised position offset from the first lowered position by some angle, wherein when the seat part is located in the first lowered position a volume of storage space exists between the seat and the floor accessible through an opening extending below and across at least a portion of the seat part, the improvement comprising:

a plate comprising a front panel supported across at least a portion of the opening for inhibiting access to the volume of storage space through the opening when the seat part is located in the first lowered position, said plate being selectively movable relative to said seat part when said seat part is in either said first lowered position or said second raised position to facilitate access to the volume of storage space, wherein the plate is supported on the floor of the vehicle by at least one end panel.

5. The improvement as described in claim 4 wherein the panel is covered with a decorative material.

6. An article for use in a motor vehicle having a floor, and a seat including a seat part pivotable between a first lowered position and a second raised position offset from the first lowered position by some angle, wherein when the seat part is located in the first lowered position a volume of storage space exists between the seat and the floor accessible though an opening extending below and across at least a portion of the seat part, the article comprising:

a plate comprising a front panel; and means for supporting the plate across at least a portion of the opening for inhibiting access to the volume of storage space through the opening when the seat part is located in the first lowered position, wherein said plate is selectively movable relative to said seat part when said seat part is in either said first lowered position or said second raised position to facilitate access to the volume of storage space, wherein the means for supporting includes at least one hinge having a first portion attached to the floor and a second portion attached to the plate.

7. The article as described in claim 6 wherein the hinge enables the plate to be moved between a first raised position, in which the opening is substantially closed and access to the volume of storage space is inhibited, and a second open position, offset from the first raised position, in which access to the volume of storage space is facilitated.

8. An article for use in a motor vehicle having a floor, and a seat including a seat part pivotable between a first lowered position and a second raised position offset from the first lowered position by some angle, wherein when the seat part is located in the first lowered position a volume of storage space exists between the seat and the floor accessible though an opening extending below and across at least a portion of the seat part, the article comprising:

a plate comprising a front panel; and means for supporting the plate across at least a portion of the opening for inhibiting access to the volume of storage space through the opening when the seat part is located in the first lowered position, wherein said plate is selectively movable relative to said seat part when said seat part is in either said first lowered position or said second raised position to facilitate access to the volume of storage space; and means for locking the plate in the first raised position when the seat part is located in its first lowered position to thereby form a secure enclosure within the volume of space, wherein the means for locking comprises:
a locking mechanism supported in the plate; and
a locking bracket attached to an underside of the seat part.

9. An article for use in a motor vehicle having a floor, and a seat including a seat part pivotable between a first lowered position and a second raised position offset from the first lowered position by some angle, wherein when the seat part is located in the first lowered position a volume of storage space exists between the seat and the floor accessible though an opening extending below and across at least a portion of the seat part, the article comprising:

a plate comprising a front panel; and means for supporting the plate across at least a portion of the opening for inhibiting access to the volume of storage space through the opening when the seat part is located in the first lowered position, wherein said plate is selectively movable relative to said seat part when said seat part is in either said first lowered position or said second raised position to facilitate access to the volume of storage space, wherein the means for supporting further includes at least one end panel.

10. The article as described in claim 9 wherein the means for supporting further includes at least one bottom panel.

11. The article as described in claim 10 wherein the at least one bottom panel is attached to the at least one end panel.

* * * * *